United States Patent [19]

Standing

[11] 4,021,758
[45] May 3, 1977

[54] DIRECT MODULATION 4 PHASE PSK MODULATOR

[75] Inventor: Arthur Frederick Standing, Rockville, Md.

[73] Assignee: Communications Satellite Corporation (Comsat), Washington, D.C.

[22] Filed: Feb. 26, 1976

[21] Appl. No.: 661,597

[52] U.S. Cl. .............................. 332/21; 178/66 A; 332/22; 332/23 R; 332/29 R
[51] Int. Cl.² ......................................... H04L 27/20
[58] Field of Search ........... 332/16 R, 21, 22, 23 R, 332/29 R; 325/30, 45, 161, 163; 178/66 A

[56] References Cited
UNITED STATES PATENTS 3,745,250  7/1973  Gerst .......................... 332/16 R X Primary Examiner—Siegfried H. Grimm
Attorney, Agent, or Firm—Sughrue, Rothwell, Mion, Zinn & Macpeak

[57] ABSTRACT

A 4 phase PSK modulator is implemented using microstrip printed circuit technology and produces a 4 phase PSK modulated carrier by direct modulation of an RF carrier. Implementation is by means of three strip-line hybrids and two semiconductor diode phase shifters. The RF carrier is applied to one input of the first hybrid, and the other input is terminated in its characteristic impedance. The outputs of the first hybrid are connected through the semiconductor diode phase shifters to the inputs of the second hybrid. The outputs of the second hybrid are directly coupled to the inputs of the third hybrid, and the 4 phase PSK output is available from each output of the third hybrid. The semiconductor diode phase shifters are controlled to produce either 0° or 180° phase shifts, and by changing the state of the diode phase shifters, a separate output phase is generated for each of the four possible diode states.

5 Claims, 12 Drawing Figures

DIRECT MODULATION 4 PHASE PSK MODULATOR

BACKGROUND OF THE INVENTION

The present invention generally relates to RF modulators, and more particularly to a 4 phase PSK modulator constructed using micro-strip printed circuit techniques and capable of working at relatively high power so that the RF carrier may be directly modulated.

Previous methods of 4 phase PSK modulation use various IF modulation techniques to produce a 4 phase PSK modulated carrier at some intermediate frequency (often on the order of 70 MHz) which is then translated by an up converter to the desired radio frequency. These methods require considerable circuitry at IF and an up converter to translate the 4 phase PSK signal to the desired radio frequency. The up converter is a low powered device that requires a driver stage, such as a travelling wave tube amplifier, before the high power output amplifier.

SUMMARY OF THE INVENTION

The present invention permits direct 4 phase PSK modulation of an RF carrier, and this is accomplished using low cost printed circuit construction which eliminates the need for a driver. More specifically, the invention uses three stripline hybrids and two diode phase shifters. The first and second hybrids are 90° hybrids, and the third hybrid is a 180° hybrid. The diode phase shifters may employ a hybrid or a circulator to produce either 0° or 180° phase shifts by reflection at the diode termination. The RF carrier is applied to one input of the first 90° hybrid and the other input is terminated in its characteristic impedance. The outputs of the first hybrid are connected through the diode phase shifters to the inputs of the second 90° hybrid. The outputs of the second hybrid are directly coupled to the inputs of the third 180° hybrid, and the 4 phase PSK output is available from each output of the third hybrid. The diode phase shifters are controlled to produce either the 0° or 180° phase shifts, and by changing the state of the diode phase shifters, a separate output signal for each of the four possible diode states.

BRIEF DESCRIPTION OF THE DRAWINGS

The specific nature of the invention, as well as other objects, aspects, uses and advantages thereof, will clearly appear from the following description and from the accompanying drawings, in which.

DESCRIPTION OF THE PREFERRED EMBODIMENT

Figure 1:
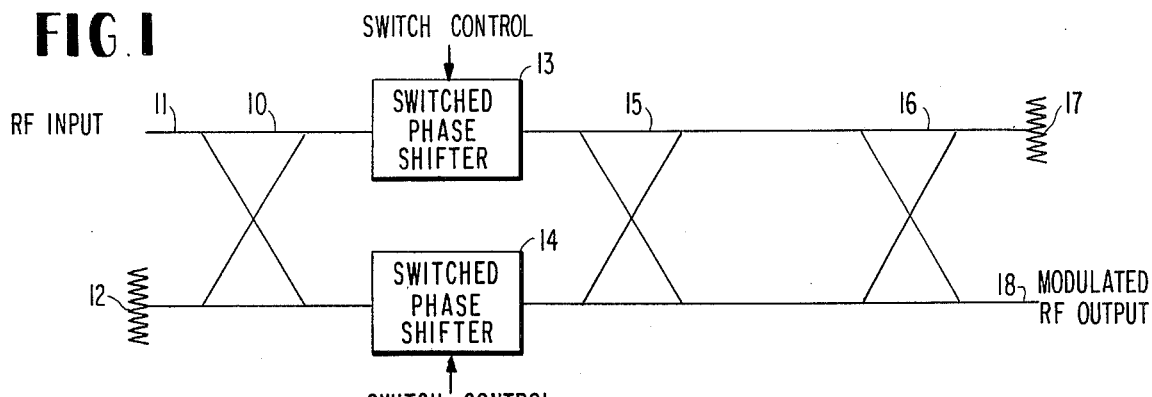
FIG. 1 is a schematic and block diagram illustrating the basic configuration of the 4 phase PSK modulator according to the present invention.

The present invention uses hybrids that can be printed in, for example, stripline and, in a preferred embodiment, diode packages which are manufactured using printed circuit techniques. Referring specifically to FIG. 1 of the drawings, a first 90° hybrid 10 has the RF input directly connected to one input 11 while the other input 12 is terminated in its characteristic impedance. The outputs of the first hybrid 10 are connected through respective switched diode phase shifters 13 and 14 to the inputs of a second 90° hybrid 15. The switched diode phase shifters 13 and 14 both operate under separate switch controls to produce either a 0° or 180° phase shift of the RF carrier. The outputs of the second hybrid 15 are directly connected to inputs of a 180° hybrid 16. This hybrid may be a commerically available 180° hybrid or may be constructed of three 90° hybrids in a manner well known in the art. The first output 17 of hybrid 16 is terminated in its characteristic impedance, and the second output 18 provides a modulated RF output.

Figure 2:
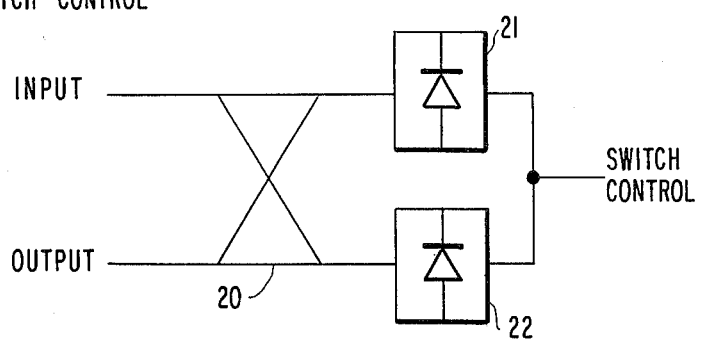
FIG. 2 is a schematic and block diagram illustrating one possible form of a 0°/180° switched diode phase shifter which can be used in the modulator illustrated in FIG. 1.

An example of a switched diode phase shifter which may be used in the invention illustrated in FIG. 1 is shown in more detail in FIG. 2. The phase shifter illustrated is known in the art as a hybrid-coupled-bit phase shifter and employs a hybrid 20 with balanced phase bits 21 and 22 connected to the coupled arms of the hybrid. Such a phase shifter is described for example in the *Radar Handbook* edited by Merrill I. Skolnik, McGraw-Hill (1970) at pages 12–54 and 12–55. The phase bits 21 and 22 take the form of diode packages employing PIN diodes. These diodes are made conducting or nonconducting with a bias supplied by the switch control and produce a phase shift by reflection of the incident RF energy.

Figure 3:
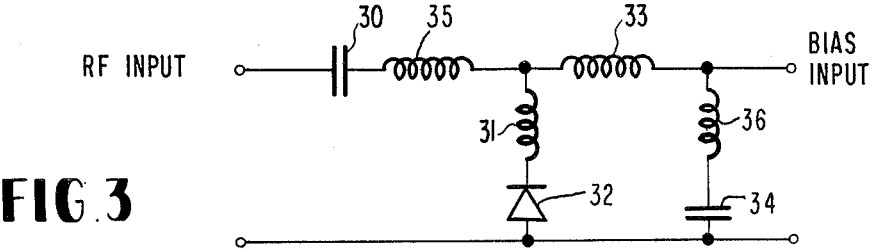
FIG. 3 is a schematic diagram of the equivalent circuit of a diode package used in the phase shifter illustrated in FIG. 2.

A preferred form of the diode package used for the phase bits 21 and 22 is the subject of my co-pending application entitled "Symmetrical Stripline Diode Package" Ser. No. 661,596 filed Feb. 26, 1976. The equivalent circuit of the diode package according to my co-pending patent application is illustrated in FIG. 3. The RF input is coupled through a bias blocking capacitor 30 and an inductor 31 to a PIN diode 32. The diode 32 is connected in shunt in a stripline circuit with either the cathode or anode of the diode connected to the ground plane and the anode or cathode of the diode connected to the inductor 31. A bias input which controls the conduction or nonconduction of the diode 32 is connected through a decoupling inductor 33 to the anode or cathode of the diode 32 via the inductor 31. In addition, a decoupling capacitor 34 is connected in shunt with the bias input. The inductances 35 and 36 shown in FIG. 3 are inductances associated with connecting leads as described in more detail in my copending application Ser. No. 661,596.

Figure 4A:
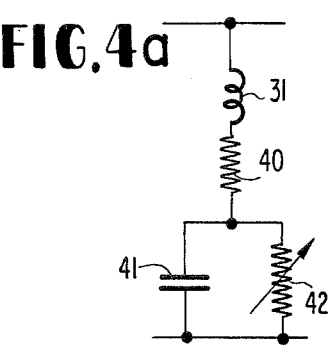
FIGS. 4a to 4e are schematic diagrams illustrating the equivalent circuits of the PIN diode used in the circuit illustrated in FIG. 3.
Figure 4B:
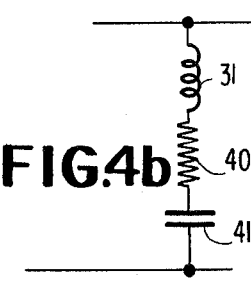
Figure 4C:
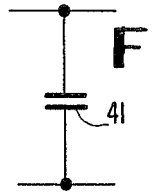
Figure 4D:
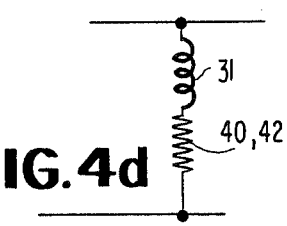
Figure 4E:
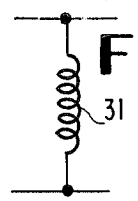

FIGS. 4a to 4e illustrates the equivalent circuits of the PIN diode. In FIG. 4a, the diode is illustrated as comprising a fixed ohmic resistance 40 connected in series with the parallel connection of the junction capacitance 41 and a variable resistance 42. The variable resistance 42 has a value which is a function of the applied bias voltage. When the diode is not conducting, the variable resistance 42, for all practical purposes, approaches infinity. As a result, the equivalent circuit of the diode in the nonconducting state reduces to the series connection of the inductor 31, the fixed resistance 40 and the junction capacitance 41 as shown in FIG. 4b. The reactance of the junction capacitance 41 is, by design, so much greater than the impedance represented by the inductor 31 and the fixed resistance 40 that, for all practical purposes, the diode package appears to be a shunt capacitance 41 shown in FIG. 4c when the diode 32 is nonconducting. On the other hand, when the diode is conducting the junction capacitance disappears and the equivalent circuit reduces to the series connection of the inductor 31 with a resistance 40, 42 shown in FIG. 4d. For all practical purposes, however, the combined resistance 40, 42 is negligible compared to the reactance of the inductor 31. As a result, the diode package appears as a shunt inductor 31 shown in FIG. 4e when the diode is conducting.

Figure 5A:
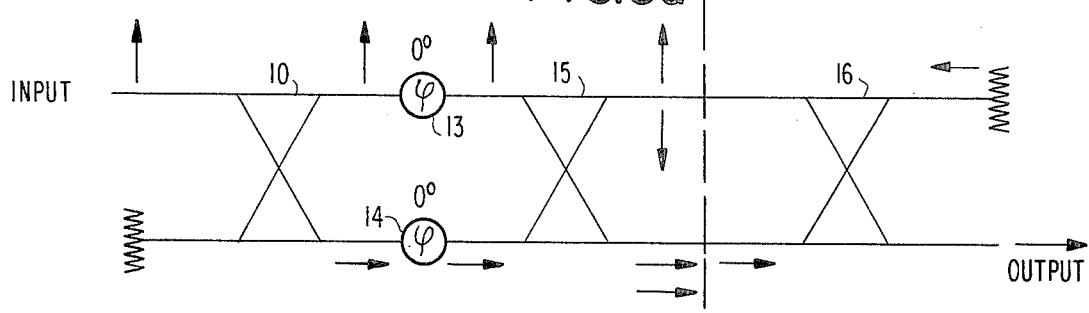
FIGS. 5a to 5d are is schematic and block diagrams of the modulator according to the invention showing the phasers for each of the four possible diode phase shifter states.
Figure 5B:
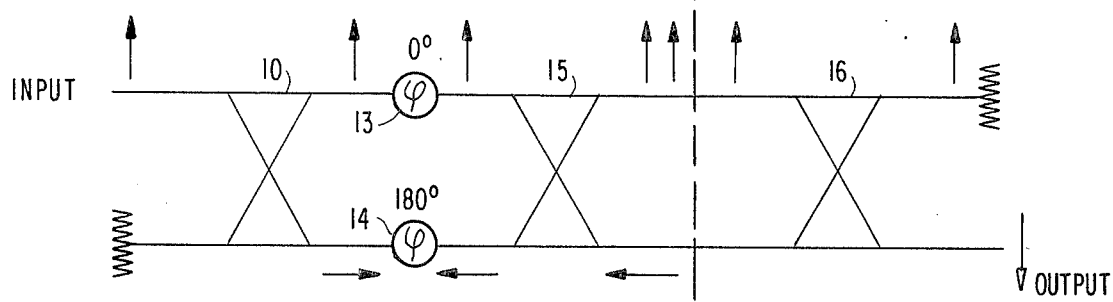
Figure 5C:
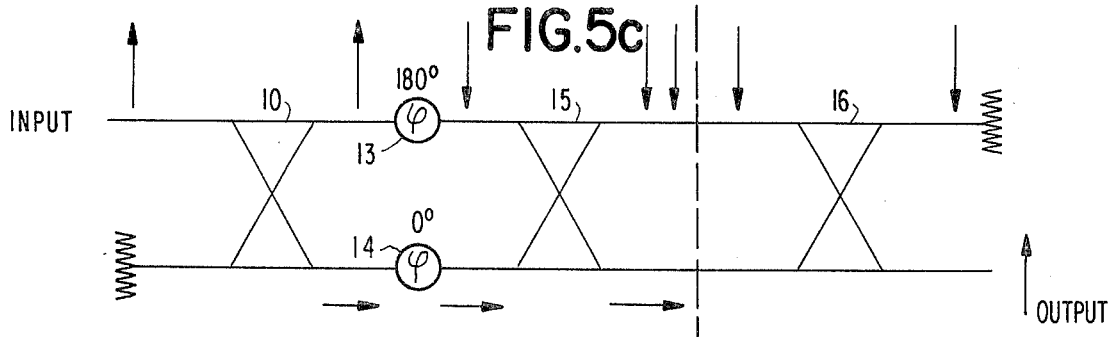
Figure 5D:
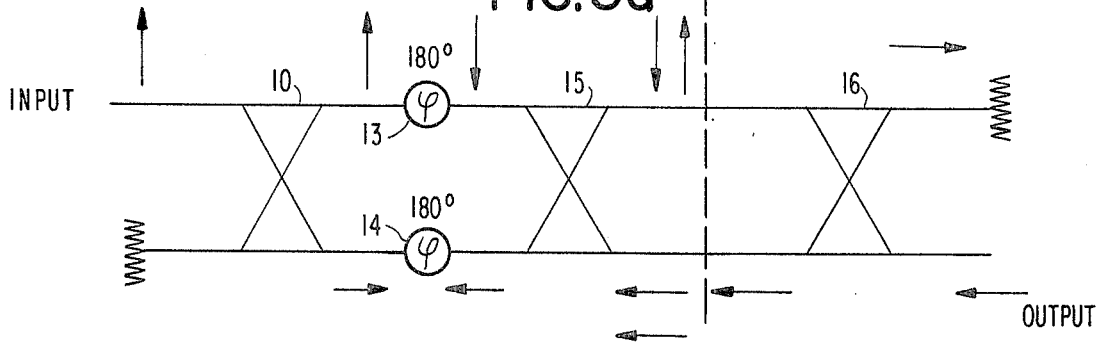

FIGS. 5a to 5d illustrate the operation of the modulator according to the invention for each of the four possible diode phase shifter states. In FIG. 5a, both of the phase shifters provide a 0° phase shift and the result is the incident RF carrier phase is shifted −90°. In FIG. 5b, the phase shifter 13 provides a 0° phase shift and the phase shifter 14 provides a 180° phase shift. This results in the input RF carrier phase being shifted by 180°. The third case is just the opposite of the second case, that is as shown in FIG. 5c, the phase shifter 13 provides a 180° phase shift while the phase shifter 14 provides a 0° phase shift. This results in no phase shift of the RF carrier phase. Finally, in FIG. 5d, both the phase shifters 13 and 14 provide a 180° phase shift. This results in a +90° phase shift of the RF carrier phase. Thus, it will be appreciated that by changing the state of the diodes in the phase shifters, a separate output phase is associated with each of the four diode phase shifter states. Moreover, it will be noted that each of the four diode phase shifter states generate outputs of the modulator that are 90° apart. This makes it possible to replace the characteristic impedance connected to the output port 17 of the third hybrid 16 with other circuitry. For example, the output from output port 17 could be used in a local oscillator.

From the foregoing, it will be appreciated that the present invention results in a low cost modulator unit by eliminating both the up converter and the driver. Also, any construction technique that can provide hybrids and a suitable diode package, from discreet components to microstrip, can be used although printed circuit stripline techniques are preferred. It will, therefore, be apparent that the specific embodiment shown is only exemplary and that various modifications can be made in construction and arrangement within the scope of the invention as defined in the appended claims.

What is claimed is:

1. A 4 phase PSK modulator for directly modulating an RF carrier comprising:
   first, second and third hybrids each having two input ports and two output ports, said first and second hybrids being 90° hybrids and said third hybrid being a 180° hybrid, one of the input ports of said first hybrid receiving the RF carrier and the other input port of said first hybrid being terminated in its characteristic impedance, the output ports of said second hybrid being directly connected to the input ports of said third hybrid, the modulated carrier being taken from either of the output ports of said third hybrid, and
   first and second switched phase shifters connected between the output ports of said first hybrid and the input ports of said second hybrid, said first and second switched phase shifters each providing switched 0° or 180° phase shifts of incident RF energy.

2. A 4 phase PSK modulator as recited in claim 1, wherein each of said first, second and third hybrids are printed circuit stripline hybrids.

3. A 4 phase PSK modulator as recited in claim 1, wherein said first and second switched phase shifters are diode phase shifters employing PIN diodes.

4. A 4 phase PSK modulator as recited in claim 3, wherein said first, second and third hybrids and said first and second diode phase shifters are printed circuit stripline devices.

5. A 4 phase PSK modulator as recited in claim 3, wherein each of said diode phase shifters comprises a hybrid having four ports, and first and second diode switches connected in shunt with two of said ports to produce said 0° to 180° phase shifts depending on the conduction or nonconduction of said diode switches.

* * * * *